Nov. 28, 1967    F. HACH, JR    3,354,930
VALVE CONTROL MECHANISM FOR GAS TORCHES
Filed Feb. 14, 1966    3 Sheets-Sheet 1
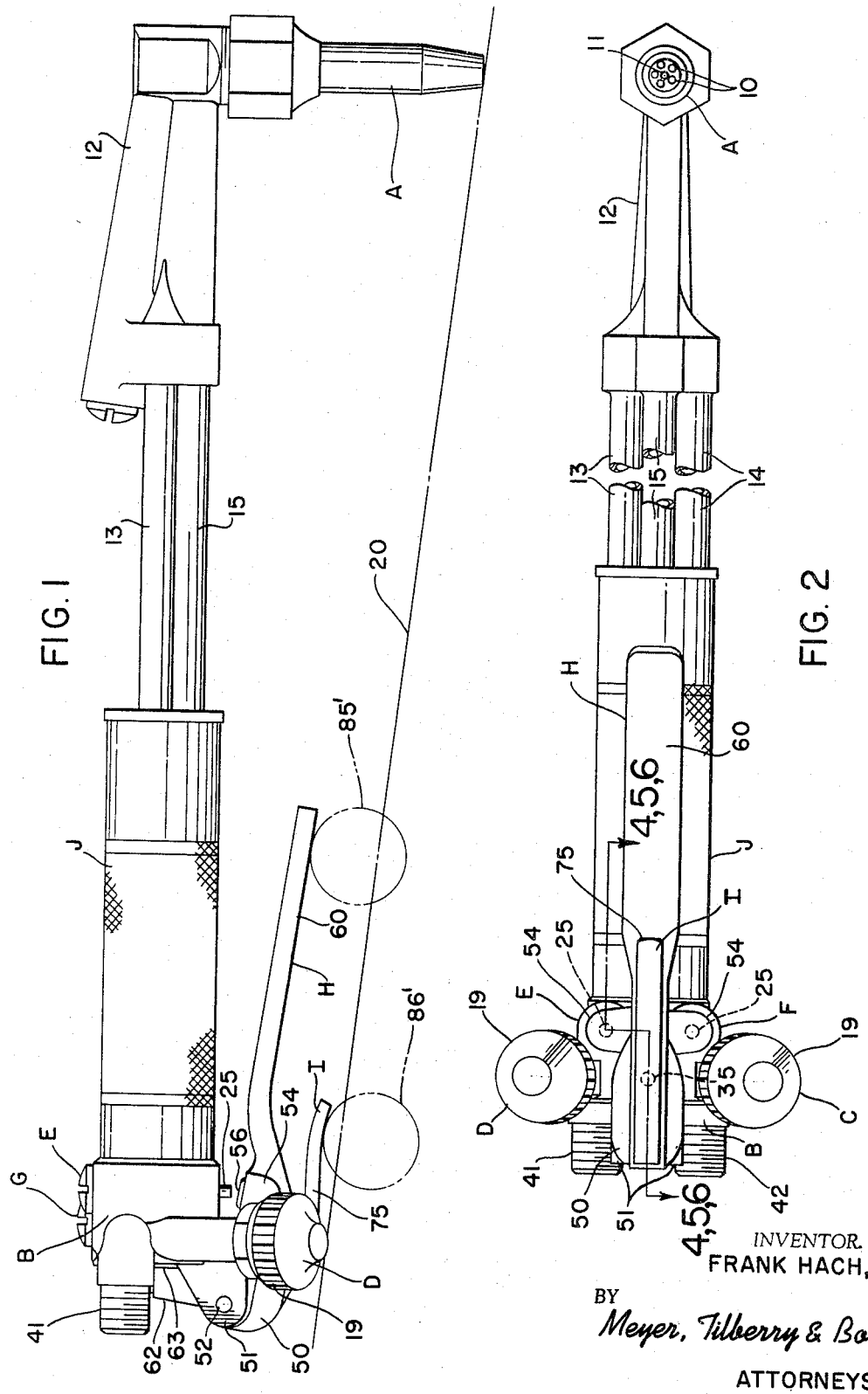
INVENTOR.
FRANK HACH, JR.
BY
Meyer, Tilberry & Body
ATTORNEYS Nov. 28, 1967 F. HACH, JR 3,354,930
VALVE CONTROL MECHANISM FOR GAS TORCHES
Filed Feb. 14, 1966 3 Sheets-Sheet 2

INVENTOR.
FRANK HACH, JR.
BY
Meyer, Tilberry & Body
ATTORNEYS

Nov. 28, 1967   F. HACH, JR   3,354,930
VALVE CONTROL MECHANISM FOR GAS TORCHES
Filed Feb. 14, 1966
3 Sheets-Sheet 3

*INVENTOR.*
FRANK HACH, JR.

BY
*Meyer, Tilberry & Body*

ATTORNEYS

United States Patent Office 3,354,930
Patented Nov. 28, 1967

3,354,930
VALVE CONTROL MECHANISM FOR GAS TORCHES
Frank Hach, Jr., Euclid, Ohio, assignor to The Harris Calorific Company, Cleveland, Ohio, a corporation of Ohio
Filed Feb. 14, 1966, Ser. No. 527,339
4 Claims. (Cl. 158—27.4)

ABSTRACT OF THE DISCLOSURE

A gas torch having a pair of on-off valves, a lever pivotally mounted on the torch and operative to open and close the valves, and a locking toggle pivotally mounted on the lever and movable in the same direction as the lever to lock the same in its various positions.

---

This invention pertains to the art of gas torches and more particularly to mechanism for controlling the operation of the valves thereof.

The invention is particularly applicable to an oxy-fuel gas cutting torch and will be described with particular reference thereto although it will be appreciated that the invention has other and broader applications.

Such cutting torches are normally comprised of a nozzle through which first a mixture of burning oxygen and a fuel gas such as acetylene is projected to preheat a piece of metal to be cut and then a stream of pure oxygen is projected to oxidize and burn away the workpiece after it has been preheated to the oxidation temperature. The torches also include a handle and a tail having a pair of manually adjustable preheat valves, one for oxygen and the other for acetylene for adjusting both the mixture and the total volume of the preheat gases. The tail in such torches sometimes includes lever-actuated oxygen and fuel gas on-off preheat valves which, when opened by partially depressing a lever, allow the flow of the preheat gases to the nozzle and an oxygen cutting valve which, when opened by further depressing the lever, allows the cutting oxygen to flow to the nozzle. Torches having manually adjustable preheat valves and lever-actuated on-off valves are particularly desirable because the operator can adjust the volume and mixture of the preheat gases and then control the preheat without affecting this adjustment. Usually the lever actuated valves are spring biased to the closed position. Difficulty has been experienced in the past when the operator laid the torch down in such a position that the weight of the torch was borne by the lever resulting in the lever actuated valves being partly opened. In such a situation, gas escaped through the nozzle which was not only expensive but in many cases quite dangerous.

Further in some torches it is necessary for the operator to manually hold the lever in the partially depressed position during the preheat operation. This can become tiresome because the preheat operation oftentimes takes a considerable period of time. Means have been provided for holding the lever in the partially depressed valve open position but in such cases moving the lever to the valve closed position became difficult.

The present invention contemplates a lever arrangement for these valves which overcomes all of the above-referred to difficulties and others and provides a control which is simple in construction, positive in operation and possesses a maximum amount of operating ease.

In accordance with the invention, a torch of the general type described is provided wherein latch means are provided for locking the lever in the valve closed position and must be manually released before the lever actuated on-off valves can be opened.

Further in accordance with the invention, the latch means lock the lever actuated preheat valves in the open position and must be manually released before these on-off valves can be closed.

Still further in accordance with the invention, the adjusting knobs for the preheat mixture valves project sidewardly from the handle in spaced relationship and the operating lever and a toggle member for releasing the latch means are positioned on the longitudinal line between these two knobs and always between the torch handle and the plane defined by the outer extremities of the two knobs and the tip of the nozzle.

The principal object of the invention is the provision of a new and improved torch of the general type described wherein the valve actuating lever is releasably locked in the valve off position.

Another object of the invention is the provision of a new and improved torch of the general type described wherein the valve actuating lever is releasably locked in the preheat valves open position.

Still another object of the invention is the provision of a new and improved torch of the general type described wherein it is next to impossible to have the on-off preheat valves accidentally moved to the open or partially open condition.

Another object of the invention is the provision of a new and improved torch of the general type described having a lever and latching arrangement for operating the on-off valves which makes lighting the torch faster and more efficient and makes it possible to instantaneously turn off the torch in emergency conditions.

The invention may take physical form in certain parts and arrangements of parts a preferred embodiment of which will be described in detail in this specification and illustrated in the accompanying drawings which form a part hereof and wherein:

FIGURE 1 is a side elevational view of an oxyacetylene cutting torch illustrating a preferred embodiment of the invention;

FIGURE 2 is a bottom elevational view thereof;

Figure 3:
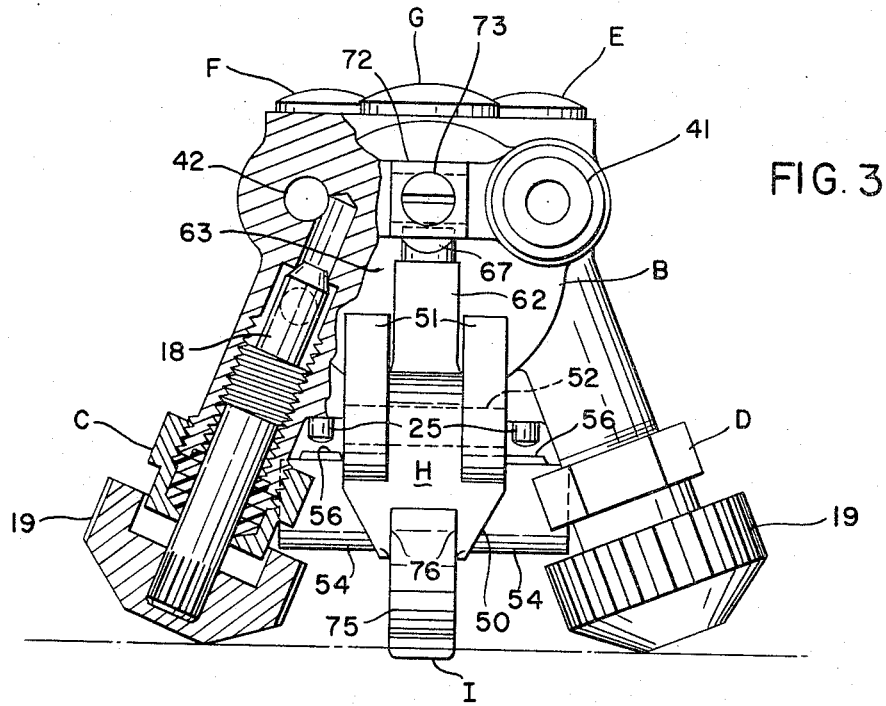
FIGURE 3 is a rear end elevational view of FIGURES 1 and 2; and with portions broken away to show the valve construction.
Figure 4:
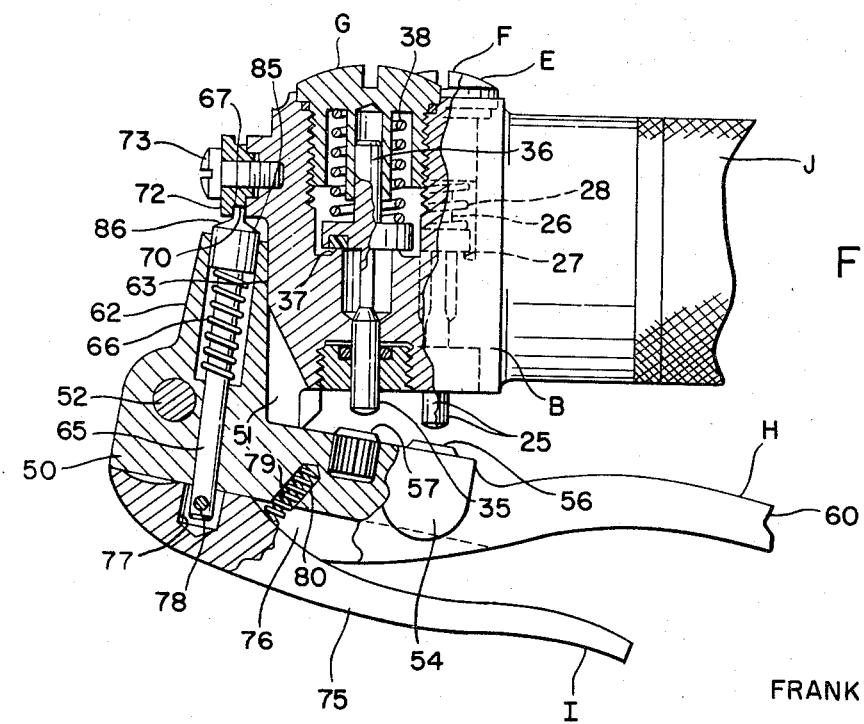
Figure 5:
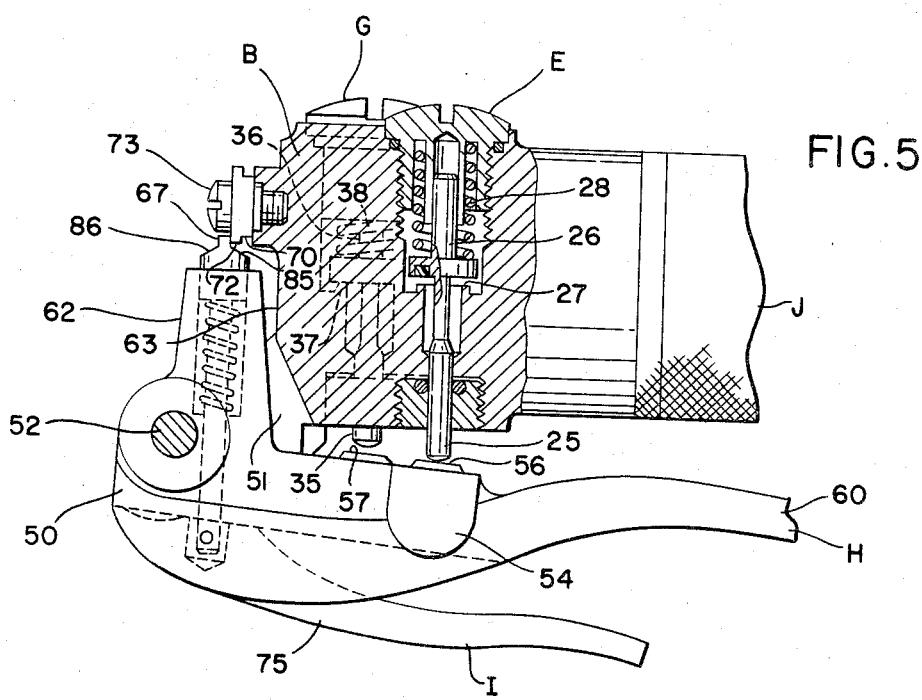
Figure 6:
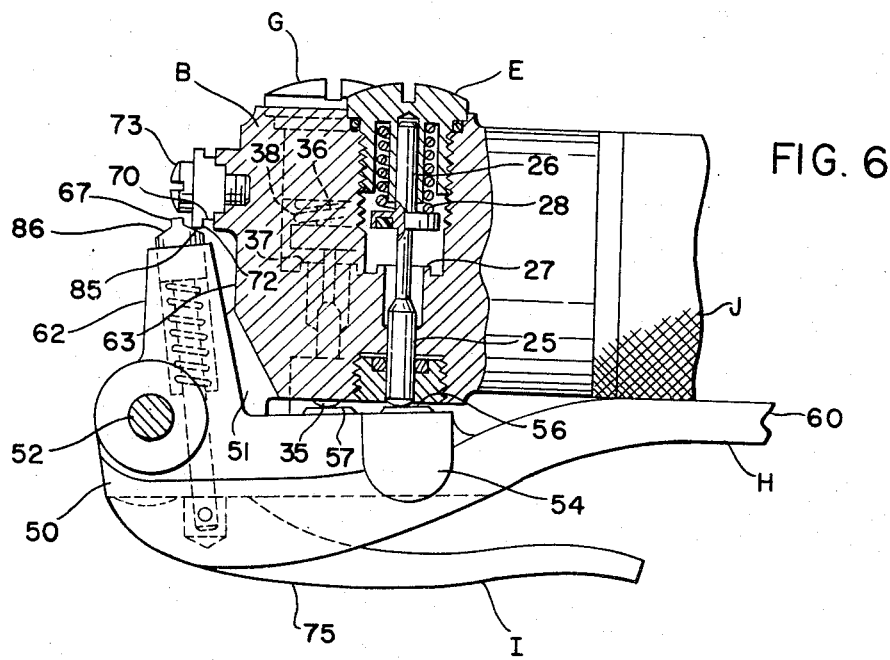

FIGURES 4, 5 and 6 are fragmentary cross-sectional views of FIGURES 1, 2 and 3 taken approximately on the lines 4—4, 5—5 and 6—6 showing the valve lever in the off, the preheat and the cut positions respectively.

Referring now to the drawings wherein the showings are for the purposes of illustrating a preferred embodiment of the invention only and not for the purposes of limiting same, the figures show an oxyacetylene cutting torch comprised of a nozzle A and a tail B having positioned therein a manually adjustable oxygen preheat valve C, a manually adjustable combustible gas, such as acetylene, preheat valve D, second oxygen on-off preheat valve E, a second combustible gas on-off preheat valve F, and an oxygen cutting valve G. A lever H simultaneously opens valves E and F upon initially being depressed and valve G upon further depressing. Toggle I releasably locks the lever in the valve closed or valve preheat position. A handle J forms a rigid extension of the tail B toward the nozzle A.

The nozzle A forms no part of the present invention and conventionally includes a plurality of preheat gas orifices 10 arranged in a circle concentric around an oxygen cutting orifice 11. The nozzle A is joined to the tail B by means of a mixing chamber elbow fitting 12 and three gaspipes 13, 14 and 15 for carrying respectively preheat combustible gas, preheat oxygen and cutting oxygen. These pipes 13, 14 and 15 extend longitudinally through and beyond the end of the handle and form the physical support for the nozzle A relative to the tail B. It is to be noted that the nozzle A extends at an angle from the general longitudinal length of the torch. While it is shown at right angles, it may be at any other angle and may be adjustable within limits.

The manually adjustable oxygen and combustible gas valves C and D are located in the end of the tail B remote from the nozzle A. The construction of these valves is conventional and forms no part of the present invention except that the valves C and D extend laterally from the tail B in generally spaced relationship and in the same direction from the longitudinal length of the torch as the nozzle A.

These valves C and D are identical and each includes a valve stem 18 threadably mounted within the tail B which stem extends outwardly below the lower side of the tail B and has a knob 19 affixed thereto for the purpose of adjusting the position of the valve stem 18. It is to be noted that the lowermost extremity of each knob 19 and the lowermost extremity of the nozzle A define a plane indicated generally by the dashed line 20, the relationship of which plane to the torch will be described hereinafter.

The second oxygen and combustible gas preheat valves E and F are identical in construction and form no part of the present invention. Suffice it to say that these valves each include a valve stem 25 reciprocably supported in the tail B on spaced parallel lines such that they project beyond the lower side of the tail B a predetermined distance. The valve stem 25 when pressed upwardly moves a valve armature 26 away from a valve seat 27 against the bias of a spring 28 which maintains these valves E and F always in the normally closed position.

The oxygen cutting on-off valve G also forms no part of the present invention and includes a reciprocably mounted valve stem 35 extending below the tail B on the general centerline between the valves C and D and E and F and to the left of the valves E and D as viewed in FIGURES 1 and 2. The oxygen cutting on-off valve includes a valve armature 36 biased to the normally closed position against a valve seat 37 by means of a resilient spring 38.

The tail B is provided with a pair of conventional threaded bosses 41, 42 for attachment to conventional fuel gas and oxygen gas supply hoses, not shown. Passages, not shown, in the tail B, and conventional, direct the combustible gas from the boss 41 to the valve D then the on-off valve E and then to the pipe 13. Similar passages direct the oxygen gas to the adjustable valve C, then to the on-off valve F and then to the pipe 14. Another passage directs the oxygen gas from boss 42 to the oxygen cutting on-off valve G and then to the pipe 15.

What has been described here is relatively conventional in the art. The present invention deals with the valve lever H which, when moved, first opens the preheat on-off valves E, F and upon further movement opens the oxygen on-off valve G together with a latching mechanism which will hold the valve lever in either the preheat on-off valve closed position, the preheat valve open position and if desired, the cutting valve open position.

In the embodiment of the invention shown the valve lever H is comprised of a base portion 50 pivotally mounted between a pair of ears 51 formed on the lower side of the tail B to the left of the valves C and D (as viewed in FIGURE 1) by means of a pin 52. The valve lever H includes a pair of ears 54 spaced from pins 52 which extend laterally from the body 50 over the valve stems 25 of the preheat valves E, F and these ears 54 have an upwardly facing seat 56 adapted to engage the outermost end of the valve stems 25. The body 50 also has an upwardly facing seat 57 generally on its centerline arranged to engage the valve stem 35 of the oxygen cutting valve G. The normal valve closed position of the lever H in the embodiment shown is determined by a boss 62 extending at generally right angles from the body 50 which abuts against a surface 63 on the left hand end of the handle B. Other means for determining the valve closed position of the lever H may be provided.

The oxygen cutting valve G is located closer to the pivot pin 52 than the valves E and F and the location of the seats 56, 57 and the projection of the valve stems 25 and 35 are such that when the handle portion 60 of the lever H is moved toward the handle J, the valve stems 25 of the valves E and F will first be engaged and these valves will first be opened. Further movement of the lever H brings the seat 57 into engagement with the valve stem 35 and opens the oxygen cutting valve G.

The latching mechanism for releasably locking the valve lever H in the positions shown in FIGURES 4, 5 and 6 may take a number of different forms but in the embodiment shown includes an armature member 65 reciprocably mounted in the boss 62 and biased upwardly by means of a spring 66 and having a projection in the form of a flat sided rib 67 extending beyond the upper end of the boss 62. This rib 67, as shown in FIGURE 4, engages in a slot 70 formed between the left hand end of the tail B and a keeper member 72 mounted on this left hand end by means of a screw 73. The member 65 can be retracted against the bias of the spring 66 by means of the toggle member I which is pivotally mounted in a groove 76 in the lower side of the body 50 and held in place by means of the armature member 65 extending into a recess 77 and pivotally fastened to the toggle member by means of a pin 78. A spring 79 positioned in a recess in the body 50 biases the toggle member I to the position shown.

As is clearly shown in FIGURE 4, the rib 67 engages in the groove 70 and thus locks the lever H in the gas off position shown in FIGURES 1 and 4. In this position it will be noted that the toggle member and the lever H are located between the lower surface of the handle B and the plane 20. Thus if the torch is laid down so as to rest on the two knobs 19 and the lowermost extremity of the nozzle A, both the lever H and toggle member I will be spaced from the surface. Furthermore, if the torch is laid upon such a flat surface but the right hand extremity of the lever H engages an object 85' on the surface, the lever H cannot move from the position shown in FIGURE 1 by virtue of the locking action of the rib 67 in the groove 70.

If the torch is laid down so that the toggle member I engages an object 86' on the surface, all this would do would be to depress the toggle member I but in the absence of the second object, such as 85', the lever H would still remain in the valve closed position.

When it is desired to preheat, it is necessary to first depress the toggle member I which withdraws the rib 67 from the notch 70 and then the lever H which moves to the position shown in FIGURE 5. At this point it is possible to release first the toggle member I and then the lever H. The rib 67 engages the left hand side of the member 72 which has a thickness such as to hold the lever H in the preheat position. In this position, the valves E and F are open allowing oxygen and combustible gas to flow to the nozzle A. The operator can then ignite these gases and then by adjusting the valves C and D manually, obtain the desired volume and mixture of gases. Once this adjustment is made, it need not be repeated because the on-off valves E and F only are used thereafter.

At this point depressing of the toggle member I will retract the member 65 withdrawing the rib 67 from the left hand end of the member 72 and the lever H will snap to the valve closed position. Release of the toggle member I then locks the lever H in this position.

In the position of FIGURE 5 the rib 67 is free on the left hand side such that the lever H can be further depressed.

Thus the operator can depress the lever H further to the position shown in FIGURE 6 in which position the oxygen cutting valve G is open and oxygen at full pressure then flows to the nozzle A and out through the oxygen orifice 11. It is also to be noted that on both sides of the rib 67 the surfaces 85, 86 taper outwardly and downwardly. If desired, a step can be provided on the surface 85 so as to lock the lever H in the cutting position. Depressing of the toggle member I a short distance will then release the lever H to snap back to the preheat position. Further depression of the toggle member I will allow the lever H to snap back to the full off or valve closed position.

It will thus be seen that an embodiment of the invention has been described which accomplishes the objects of the invention heretofore set forth and others and provides a cutting torch which can selectively have the on-off valves locked in any position and which prevents the on-off valves from being accidentally opened. Also the preheat flame may be ignited and extinguished without the need to adjust the adjustable valves C and D.

The invention has been described with reference to a preferred ambodiment. Obviously, modifications and alterations differing radically in appearance will occur to others upon a reading and undertsanding of this specification and it is my intention to include all such modifications and alterations insofar as they come within the scope of the appended claims.

Having thus described my invention, I claim:

1. In an oxy-fuel gas torch including a body and a nozzle, a pair of manually adjustable valves in said body for controlling the volume and mixture of gases supplied to said nozzle, a pair of on-off valves in said body each having an open and a closed position for starting and stopping the flow of gas to said nozzle, a lever pivotally mounted on said body and operatively associated with said last-mentioned valves said lever being pivotable from a first position where said valves are closed to a second position where said valves are open and locking means for selectively locking said lever in both of said positions, including a toggle member pivotally mounted on said lever and movable in the same direction as said lever from a first station, in which said lever is locked in its first position, to a second station in which said lever is locked in its second position.

2. The torch of claim 1 where said body has a third on-off valve having an open and a closed position for controlling the flow of cutting oxygen to said nozzle and said lever is operatively associated therewith and has a third position wherein said oxygen valve is open and said latch means selectively hold said lever in said first, second or third position.

3. The torch of claim 1 wherein a normally closed oxygen on-off valve is in said body and said lever is operatively associated therewith and having a third position where said oxygen cutting control valve is open, being freely movable between said second position and said third position.

4. In a cutting torch comprised of an elongated body and a nozzle spaced from such body and rigidly fastened thereto, said nozzle having a tip displaced in one direction from the longitudinal length of said handle, a pair of valves in said body and having valve stems with knobs thereon projecting laterally from said body in spaced relationship in the same general direction as said nozzle, the ends of said knobs and said nozzles defining a plane, said body having other valves and a lever for actuating said other valves pivotally supported on said body, said lever having a valve off and a valve on position, and locking means for selectively locking said lever in said valve closed position and said valve open position, including a toggle member pivotally mounted on said lever and movable in the same direction as said lever from a first station, in which said lever is locked in said valve off position, to a second station in which said lever is locked in said valve on position, said lever in said valve off position and said toggle member in said first station being positioned entirely within the space between the body and said plane.

References Cited

UNITED STATES PATENTS

| | | | |
|---|---|---|---|
| 1,303,178 | 5/1919 | Dunham | 158—27.4 |
| 1,494,747 | 5/1924 | Jenkins | 158—27.4 |
| 1,810,158 | 6/1931 | Campbell | 158—27.4 |
| 1,920,965 | 8/1933 | Campbell | 158—27.4 |
| 2,213,748 | 9/1940 | Stettner | 158—27.4 |

FREDERICK L. MATTESON, JR., *Primary Examiner.*

E. G. FAVORS, *Assistant Examiner.*